US008464265B2

(12) United States Patent
Worley

(10) Patent No.: US 8,464,265 B2
(45) Date of Patent: Jun. 11, 2013

(54) METHOD AND SYSTEM FOR REALLOCATING COMPUTATIONAL RESOURCES USING RESOURCE REALLOCATION ENABLING INFORMATION

(75) Inventor: John S. Worley, Fort Collins, CO (US)

(73) Assignee: Secure64 Software, Greenwood Village, CO (US)

( * ) Notice: Subject to any disclaimer, the term of this patent is extended or adjusted under 35 U.S.C. 154(b) by 2187 days.

(21) Appl. No.: 11/397,918

(22) Filed: Apr. 3, 2006

(65) Prior Publication Data

US 2007/0230477 A1 Oct. 4, 2007

(51) Int. Cl.
*G06F 9/46* (2006.01)
(52) U.S. Cl.
USPC .......................................... 718/104
(58) Field of Classification Search
None
See application file for complete search history.

(56) References Cited

U.S. PATENT DOCUMENTS

| 6,131,144 | A | 10/2000 | Koppala | |
|---|---|---|---|---|
| 7,340,744 | B2 * | 3/2008 | Chandwadkar et al. | 718/105 |
| 7,711,831 | B2 * | 5/2010 | Aiken et al. | 709/228 |
| 2004/0078562 | A1 * | 4/2004 | Koning et al. | 713/151 |
| 2005/0114547 | A1 | 5/2005 | Wu | |
| 2005/0166206 | A1 * | 7/2005 | Parson | 718/104 |
| 2005/0283711 | A1 | 12/2005 | Claseman | |
| 2006/0020769 | A1 | 1/2006 | Herrel et al. | |
| 2006/0245416 | A1 * | 11/2006 | Faubel et al. | 370/352 |
| 2007/0008988 | A1 * | 1/2007 | Kim et al. | 370/462 |
| 2009/0133023 | A1 * | 5/2009 | Li et al. | 718/102 |

OTHER PUBLICATIONS

Tanenbaum, Andrew S., Structured Computer Organization, 1984, Prentice-Hall, Second Volume, p. 11.*

* cited by examiner

*Primary Examiner* — Meng An
*Assistant Examiner* — Eric C Wai
(74) *Attorney, Agent, or Firm* — Olympic Patent Works PLLC

(57) ABSTRACT

Various embodiments of the present invention are directed to an efficient and flexible method and system for managing a pool of computational resources that can be allocated from a resource pool, used for varying periods of time, and eventually returned to the resource pool. Certain embodiments of the present invention are directed to a method and system for efficiently managing ephemeral ports used for short-duration communications connections. In one embodiment of the present invention, an array of port tables is employed to store and manage a large space of ephemeral protocol ports. Each port table is a circular buffer, each entry of which includes a port number that uniquely identifies a communications port, a sequence number that allows the port to be immediately reallocated, and any other additional protocol-specific information that may be associated with the port. A non-local-port-number portion of a connection address, comprising a remote IP address, a remote port number, and a local IP address, may be hashed to generate a numerical reference to a particular port table within the array, or list, of port tables, and ephemeral ports for the non-local-port-number portion of a connection address are allocated from, and deallocated and returned to, the numerically identified port table.

16 Claims, 17 Drawing Sheets

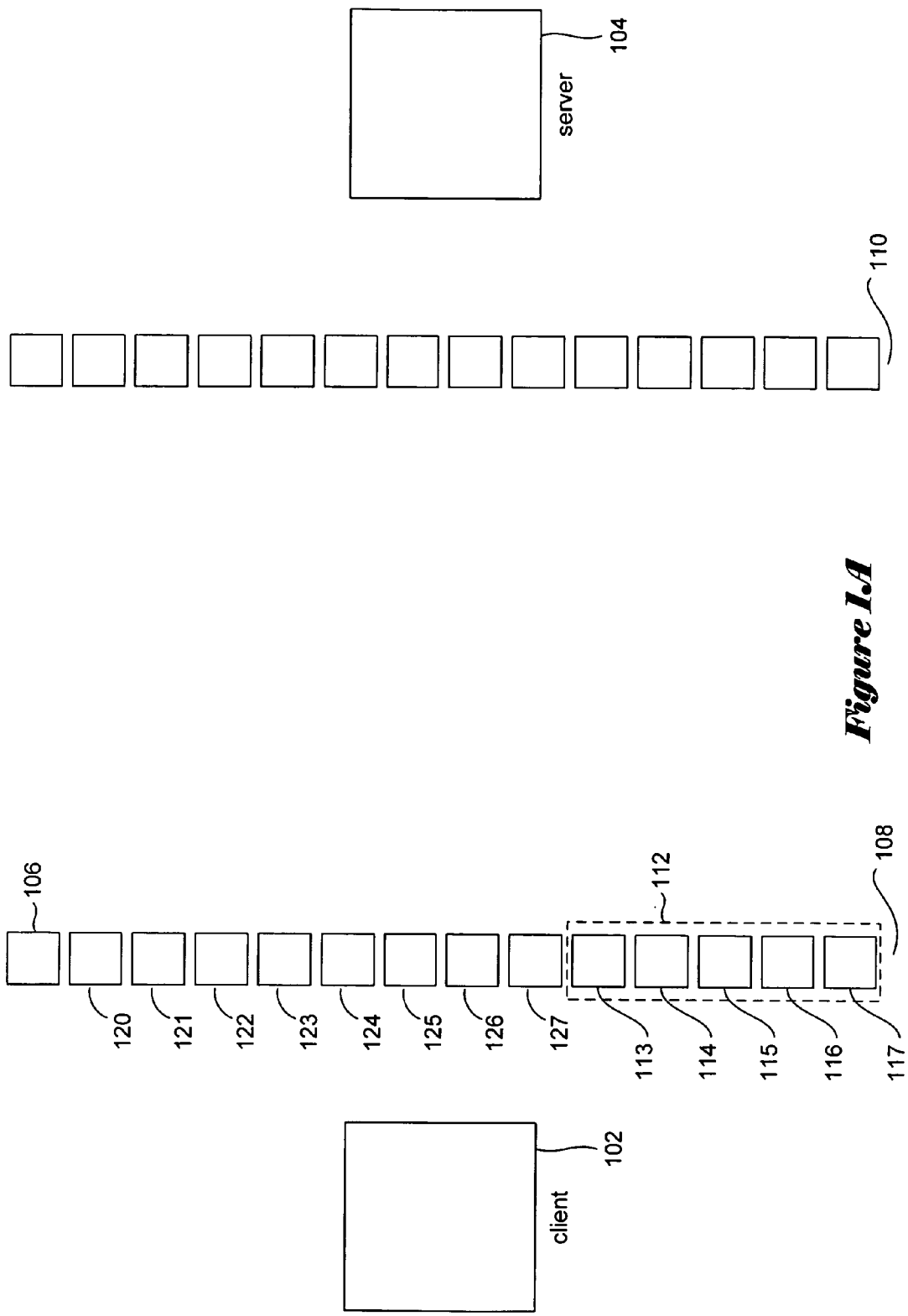

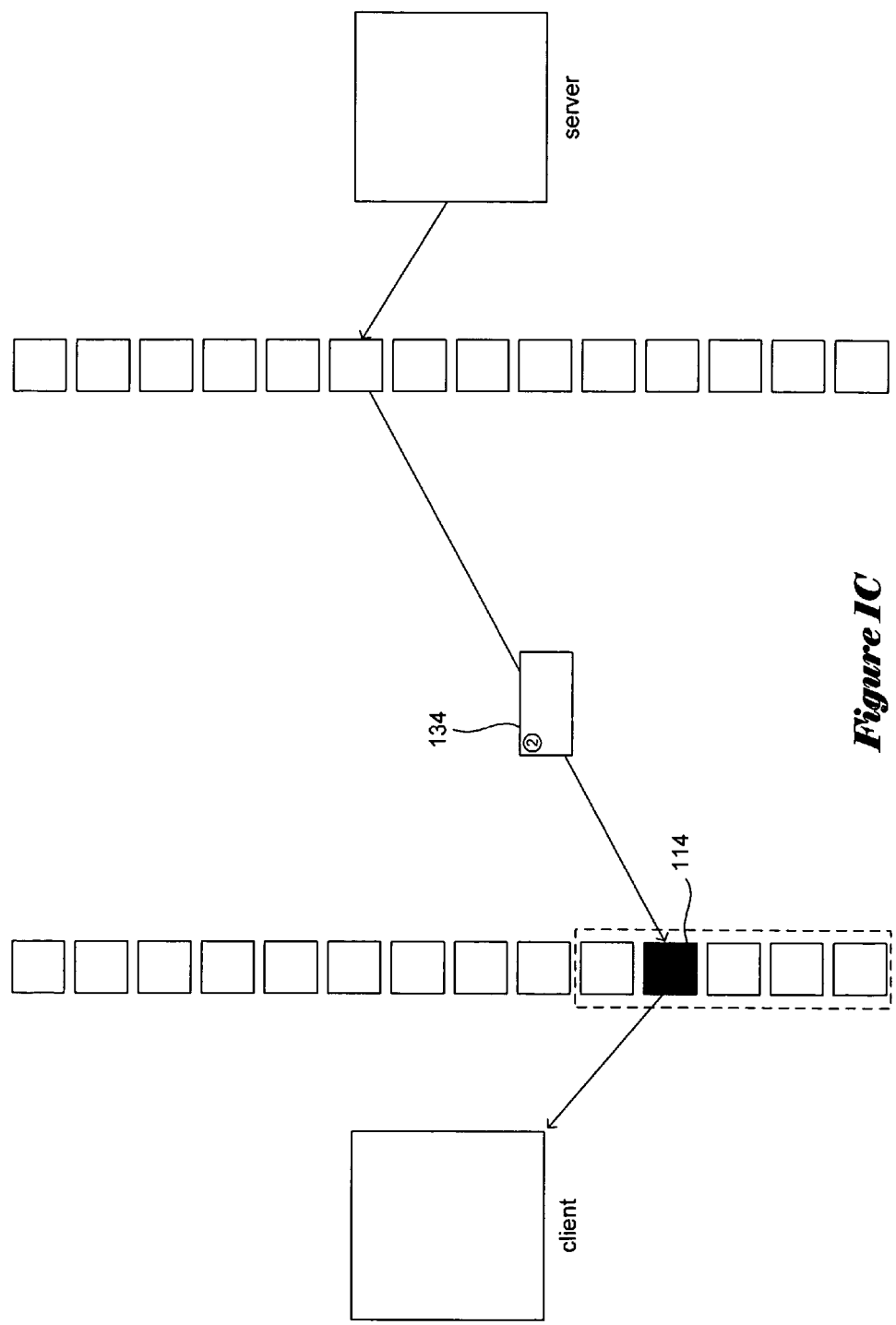

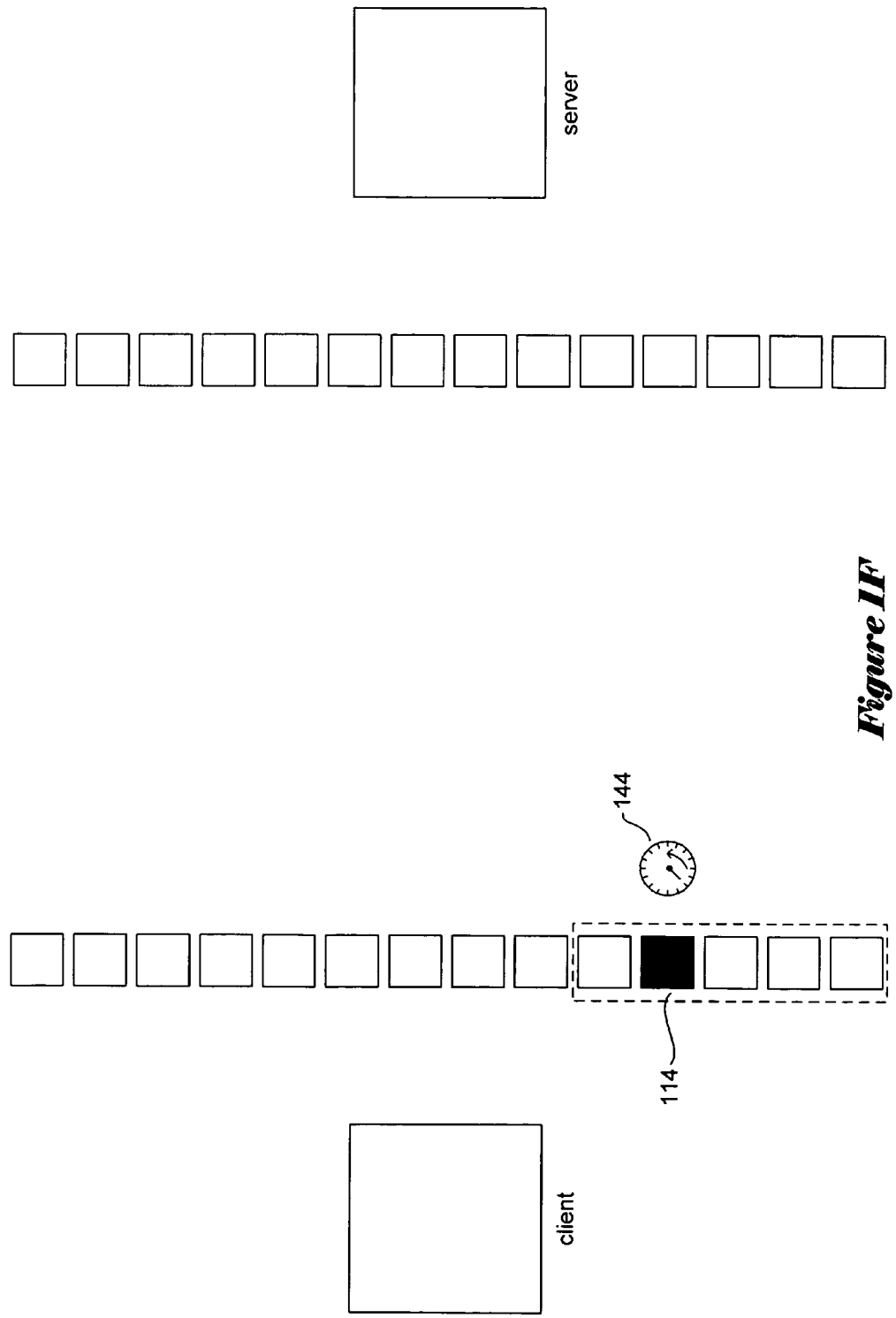

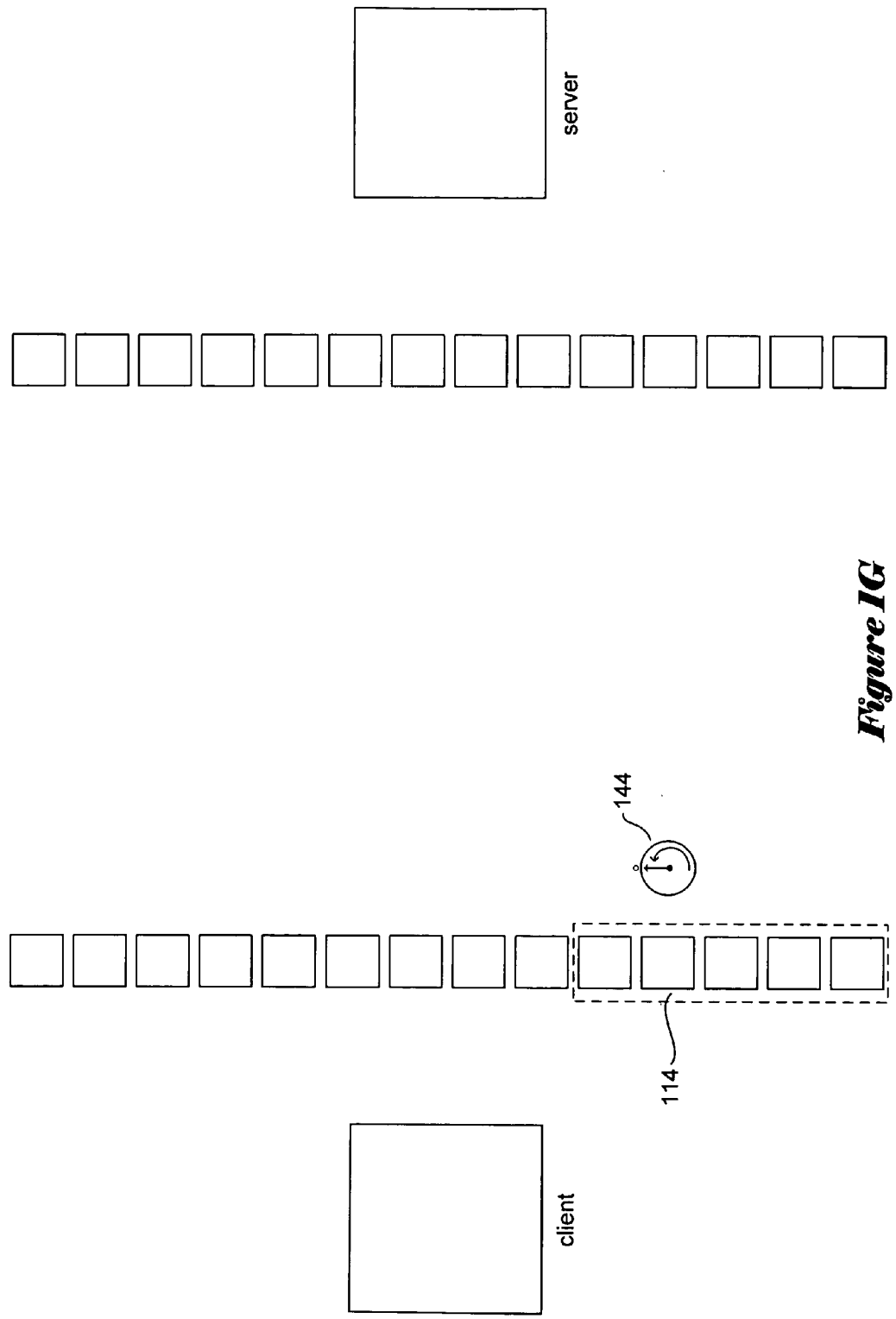

406 — free
404
408 — avail
402
410

| A | 35 |
| B | 2 |
| C | 86 |
| D | 19 |
| E | 29 |
| F | 74 |
| G | 61 |
| H | 45 |
| I | 17 |
| J | 81 |
| K | 14 |
| L | 16 |
| M | 97 |
| N | 55 |
| O | 91 |
| P | 4 |
| Q | 34 |
| R | 49 |
| S | 51 |
| T | 77 |
| U | 83 |
| V | 89 |
| W | 11 |
| X | 9 |
| Y | 58 |
| Z | 94 |

*Figure 4A*

METHOD AND SYSTEM FOR REALLOCATING COMPUTATIONAL RESOURCES USING RESOURCE REALLOCATION ENABLING INFORMATION

TECHNICAL FIELD

The present invention is related to computer algorithms and resource management and, in particular, to a method and system for managing, with low computational overhead and minimal delays, computational resources within a computer system that are allocated from a pool, deallocated and returned to the pool after various periods of use for reallocation.

BACKGROUND OF THE INVENTION

The present invention is generally directed to, and applicable to, management of any of a wide variety of different types of computational resources in computer systems. The present invention is discussed, below, with reference to a particular class of communications-resources management problems, but that class of problems is merely a convenient context in which to describe the present invention.

A wide variety of different types of communications protocols have been developed for exchanging data between computer systems. An exemplary communications protocol is the transmission control protocol ("TCP"), a middle-level protocol that provides reliable, sequenced, in-order message exchange over the lower-level internet protocol ("IP") and that, together with the IP, provides one of the primary communications backbones for the internet. Many additional types of computer protocols are currently used on a variety of networking platforms, including protocols for Ethernet-based local area networks and protocols for fiber-channel communications that are often used to interconnect mass-storage-device components and interconnect host computers with mass-storage devices. Although the discussion below is based on a specific TCP-like example, the present invention is not limited to application to TCP-related communications resources, but finds general application for managing communications resources within any number of different types of computer systems that support various different communications protocols above a wide variety of different types of hardware and software.

In the current discussion, the term "communications port" refers generally to a resource used to establish a communications connection between two computer systems. In general, this is a logical resource, called a protocol port, that identifies a communications endpoint for a given protocol associated with a protocol address. A communications port may also be a physical connection that interfaces a computer system to a communications medium, an internal interface between an internal data bus and a communications-medium controller, or numerous other physical, operating-system, or protocol interfaces involved in exchange of data and commands between internal processing components of a computer system and a communications medium. For the purposes of describing the present invention, the term "communications port" refers to an interface that is directly or indirectly treated as a computational resource by a computer system involved in establishing communications connections between the computer system and a remote computer system, the exact nature of the communications port in any given system depending on the hardware and software components of the system.

FIGS. 1A-I illustrate communications ports, communications connections, and a number of problems observed in currently available communications-resources management strategies. FIGS. 1A-I all employ similar illustration conventions, described below with respect to FIG. 1A.

FIG. 1A shows a simple, abstract computational environment for communications between a client computer and a server computer. As shown in FIG. 1A, both the client computer 102 and the server computer 104 employ a fixed number of communications ports, each port represented by a small square, such as port 106 employed by client computer 102, for establishing and carrying out a communications transaction, or connection, with remote computers. In the example of FIGS. 1A-I, the client computer 102 employs a fixed number of ports arranged in a column 108 associated with the client computer, and the server computer 104 employs a fixed number of ports arranged in a column 10 of ports associated with the server computer. Ports are logical entities, each uniquely identified within a computer system by a port number, that represent the interconnection resources within a computer system related to a particular type of protocol stack and networking system. A computer system may concurrently conduct as many connections with remote computers using the protocol as there are ports. In general, the ports are partitioned into various port classes. One class, indicated in FIG. 1A by a dashed rectangle 112, comprises a set of ephemeral ports that are used for relatively short-duration connections. The ports 113-117 within the class of ephemeral ports 112 constitute a pool of ephemeral ports from which ports are allocated and to which deallocated ports are returned at relatively high frequency. The remaining ports 106 and 120-127 are generally reserved for specialized applications, connections, and tasks.

The total number of ports available in a computer system may be quite large. However, for purposes of describing the present invention, the number of ports available within a computer system is generally irrelevant. Instead, what is relevant is that the number of ports is fixed, and the number of ephemeral ports needed for short-duration connections that are established and terminated at high frequency during system operation is generally a significantly smaller, fixed number than the total number of ports. The ephemeral ports, represented in FIG. 1A by ports 113-117 within the dashed rectangle 112, represent a potential bottleneck. The ephemeral ports represent a pool of computational resources that needs to be managed carefully by the computer system in order to maintain as high a throughput of short-duration connections as possible, with concomitant minimal computational overhead and delays in ephemeral-port allocation and other ephemeral-port management operations.

FIGS. 1B-F illustrate an exemplary client/server communications (protocol?) connection. In FIG. 1B, the client computer selects port 114 from the pool of ephemeral ports 112 through which to establish a connection to the server computer 104 via a dedicated server port 130. As part of the connection-establishment protocol, a message 132 is sent from the client computer via the selected port 114 to the dedicated port 130 of the server computer. Note that, in FIG. 1B and in subsequent figures, a port that has been allocated for a connection is shown shaded, to indicate that the port is not currently available for allocation.

Next, as shown in FIG. 1C, the server replies to the initial message with a return message 134 directed by the server computer to the selected client port 114. In the exemplary connection-establishment protocol illustrated in FIGS. 1B and 1C, only two messages are exchanged between the client and server to establish a connection. However, in commonly used protocols, such as the TCP protocol, exchange of more than two messages may be needed to establish a connection.

The two-message exemplary connection protocol illustrated in FIGS. 1B-C is used for the sake of brevity and illustration clarity.

Next, as shown in FIG. 1D, additional messages 136-140 are exchanged between the client and server computers, in both directions, in order to complete a communications transaction. For example, files may be transferred, databases accessed and data returned, a web-page-based dialog may be carried out, or many other such activities may be carried out through an exchange of data via the communications connection. Each message is associated with a sequence number to facilitate message ordering. In the example of FIGS. 1B-1F, the third through $n^{th}$ messages 136-140 exchanged between the client and server computers carry the data relevant to a higher-level transaction conducted through the connection. Finally, as shown in FIG. 1E, when the higher-level transaction is complete, the server may send a final, $(n+1)^{th}$ message 142 to the client computer to indicate that the connection is terminated. In many currently used protocols, connection termination may involve exchange of multiple messages, and may be initiated by either the client or server computers. The simple, single-message termination illustrated in FIG. 1E is convenient for illustration clarity and brevity.

Upon receiving the termination message, the client computer considers the connection to the server computer to be terminated, as shown in FIG. 1F. However, the client port 114 and server port 130 through which the connection was conducted remain unavailable for some period of time for reconnecting the client computer to the server computer. Identifiers for the client port and server port serve to, in part, identify the client/server connection. When the connection is terminated, a new, identically identified connection cannot be re-established until after a period of time has elapsed, to allow, among other things, for correct handling of any delayed or repeated messages. Were an attempt made by the client to immediately re-establish the connection to the server through the same ephemeral client port, the server would generally reject the connection request, with an exception to be discussed below.

In essence, one may consider that a timer 144 is associated with each port to indicate some fixed-length time period, or wait period, during which the port remains unavailable for reallocation. There are several ways for a port to become immediately reusable, or reallocatable, without potentially resulting in failed connection requests due to the above-described wait periods associated with ports of terminated connections. FIG. 1G illustrates a first reallocation-enabling event. As shown in FIG. 1G, the timer 144 may expire, at which time port 114 may re-enter the pool of available ephemeral ports. FIG. 1H shows a second reallocation-enabling event that allows port 114 to become available for reallocation. As shown in FIG. 1H, if a next connection request 146 with a sequence number 148 greater than the sequence number 147 of the final message of the previous connection conducted through the ephemeral port is transmitted through the ephemeral port, then the connection request is not rejected, even when sent to the same server and server port that was previously connected to the client computer through the ephemeral port. This sequence-number-based exception allows for rapid re-establishment of identically-identified connections between computer systems in a way that prevents ambiguities in sequence numbering due to delayed messages transmitted through the most recently terminated connection. A third reallocation-enabling event is for the ephemeral port to be used for sending a connection request to a different server or to a different port of the same server, so that the resulting connection does not share the identity of the most recently terminated connection.

Whether or not a particular, first sequence number is greater than a second sequence number depends on the particular communications protocol in which the sequence numbers are used. For example, in certain cases, sequence numbers are represented by unsigned integers of fixed sizes. An ordered set of sequence numbers wraps back, from the maximally valued unsigned integer, to 0. Were an 8-bit unsigned integer used for sequence numbers, then the integer 0 directly follows the integer 255, and the integer 3 follows the integer 255 by 4 sequence numbers. On the other hand, the integer 255 follows the integer 3 by 252 sequence numbers. Thus, without a further definition for "greater," a first sequence number of any value may follow, or be greater than, a second sequence number. One way to resolve potential ambiguity is to define a maximum distance by which one sequence number may follow another. In the currently discussed example, were a maximum distance set at 10, 3 follows 255, but 255 would not follow 3. Many other techniques for resolving such ambiguities may also be used.

Because there are a fixed and limited number of ephemeral ports available for short-duration connections, the pool of ephemeral ports together represents a potentially limiting computational resource. FIG. 1I illustrates a bottleneck that may be created by allocation of all ephemeral communications ports within a computer system. As shown in FIG. 1I, it may happen that all of the ephemeral ports 113-117 are allocated and are currently being used for connections to remote servers. In this case, subsequent attempts to allocate ephemeral ports fail. In other words, the concurrent-connection bandwidth for the computer system cannot be further expanded. Additional attempts to create connections fail, resulting in communications delays and even in failed higher-level transactions that, in turn, may result in additional computational overheads, communications delays, and even large-scale system failures. Even when a connection is terminated, the ephemeral-port resource pool may remain fully expended for a significant period of time. FIG. 1J illustrates the system, shown in FIG. 1I, following termination of one of the communications connections. In this case, the port 114 to which the terminated connection was conducted continues to remain unavailable for a fixed period of time, as discussed above with reference to FIGS. 1F-G, in order to prevent connection-request rejections that would occur were the port to be immediately and inadvertently reused to reconnect to the same port of the same server of the terminated connection In many currently available communications and networking implementations, the pool of ephemeral ports is managed through a complex, multi-tiered list structure in which available ports are maintained on a free list, and allocated ports are maintained in various allocated-port lists representing currently used ports. Such structures are computationally expensive to manage, entailing both processing overheads and memory-space overheads that tend to quickly increase as the ephemeral-port resources approaches maximum resource allocation, potentially exacerbating computational bottlenecks resulting from the high computational overhead associated with high message traffic through a large number of concurrent communications connections. In other currently available communications and networking implementations, ports are managed through bitmaps, which are associated with similar computational overheads. Communications-protocol and network designers, computer vendors, operating-system designers and vendors, computer-system manufacturers, and computer users have all recognized the need for continued advancement and improvement in communications throughput and communications-connection bandwidth that can be achieved on any particular hardware and software platform. Moreover, the general resource management problems to which the above-described communication-port-management problems belong include many other types of resources in computer systems that may be immediately reused, following deallocation from a previous use, only when resource-reallocation-enabling information is associated with the resources to facilitate immediate reuse, and general methods for increasing efficiencies in managing such resources are continually sought by researchers, developers, manufacturers, and users of computer systems.

SUMMARY OF THE INVENTION

Various embodiments of the present invention are directed to an efficient and flexible method and system for managing a pool of computational resources that can be allocated from a resource pool, used for varying periods of time, deallocated, returned to the resource pool along with resource-reallocation-enabling information that facilitates immediate reallocation and use of the resource. Certain embodiments of the present invention are directed to a method and system for efficiently managing ephemeral ports used for short-duration communications connections. Communications ports are allocated from the pool, used for varying periods of time, and deallocated. A deallocated communications port may be immediately reallocated only when immediate reallocation is facilitated by use of resource-reallocation-enabling information associated with the port. Resource-reallocation-enabling information, in these embodiments, may be either the final message sequence number used in a previous connection through the communication port, or a next sequence number that can be used in a connection request subsequently sent through the port in order to avoid connection-request rejections due to immediate communications-port reuse. In one embodiment of the present invention, available communications ports are stored in port tables within an array of port tables. Each port table is a circular buffer, each entry of which includes a port number that uniquely identifies a communications port, a next sequence number that allows the port to be immediately reused, and any other additional information that needs to be associated with the port uniquely identified by the port number. A numerical identifier of a connection address, or portion of a connection address, is hashed to generate a numerical reference to a particular port table within the array, or list, of port tables, and ephemeral ports for the connection address are allocated from, and deallocated and returned to, the numerically identified port table. In alternative embodiments, only a single port table is employed.

BRIEF DESCRIPTION OF THE DRAWINGS

FIG. 1A shows a simple, abstract computational environment for communications between a client computer and a server computer.

FIGS. 1B-F illustrate an exemplary client/server communications connection.

FIG. 1G illustrates a first reallocation-enabling event.

FIG. 1I illustrates a bottleneck that may be created by allocation of all ephemeral communications ports within a computer system.

FIGS. 4A-E illustrate various states of a port table, representing one embodiment of the present invention, which result from various operations carried out on the port table.

DETAILED DESCRIPTION OF THE INVENTION

Method and system embodiments of the present invention are directed to efficient management of a pool of computational resources. Described embodiments are directed to management of communications ports. As discussed above, a pool of communications ports may represent a limiting resource for computer systems, and communications ports are currently sub-optimally managed using complex data structures and wait periods in many computer systems. Methods of the present invention provide efficient management of a pool of communications ports. Alternative embodiments of the present invention may be employed to manage any number of different types of computer resources that are allocated from a pool, used for some period of time, deallocated and returned to the pool along with resource-reallocation-enabling information that facilitates immediate reallocation and use of the resource. A communications-protocol example is used as a context to describe certain embodiments of the present invention, but the present invention is applicable to a wide variety of different electronic communications systems in addition to the simple, client/server communication protocols discussed below, and to a much wider variety of computational-resource-management problems, as discussed above.

Figure 1B:
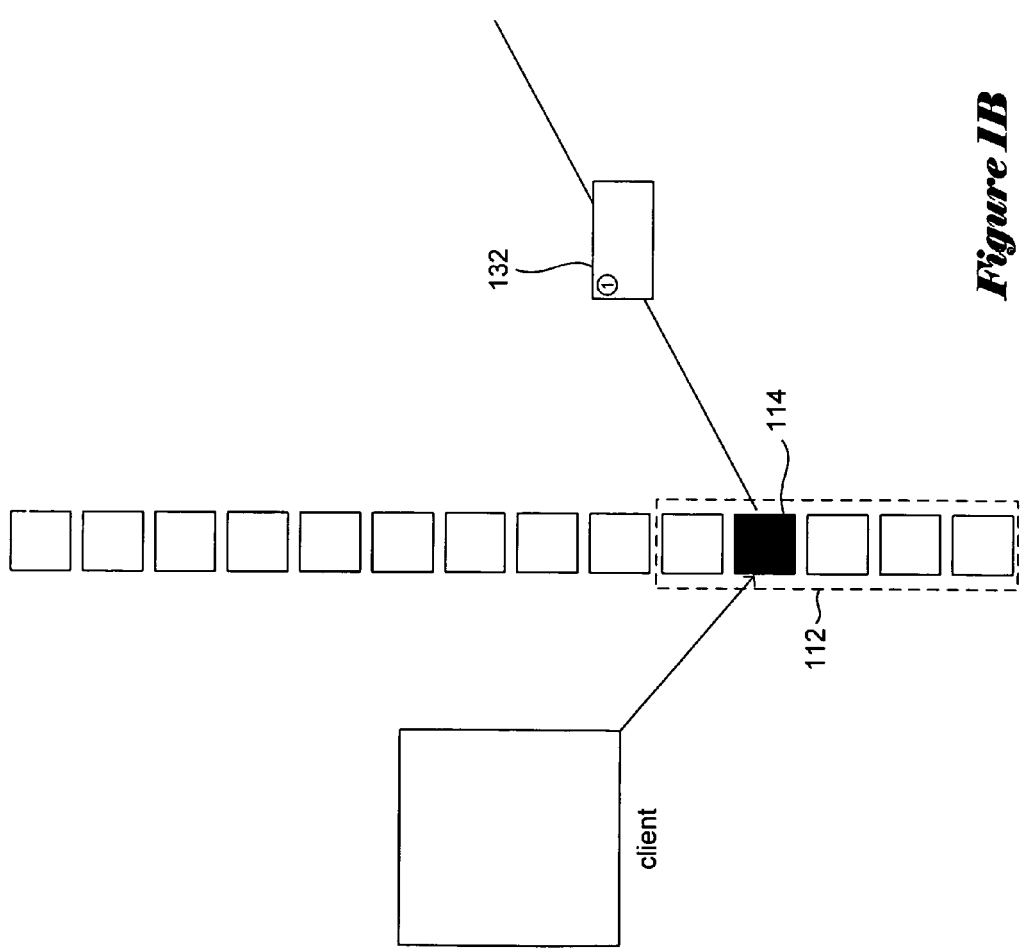
Figure 1D:
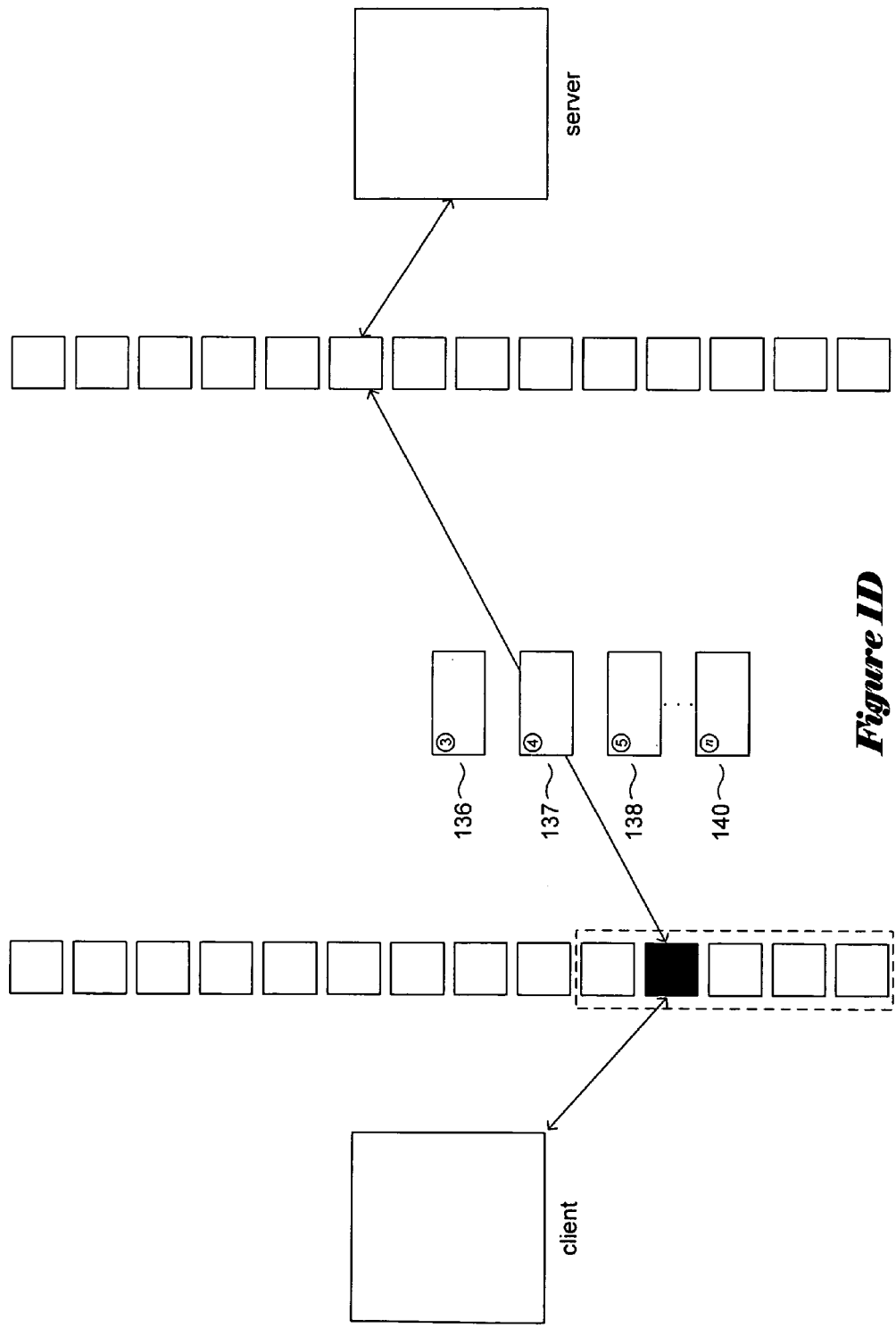
Figure 1E:
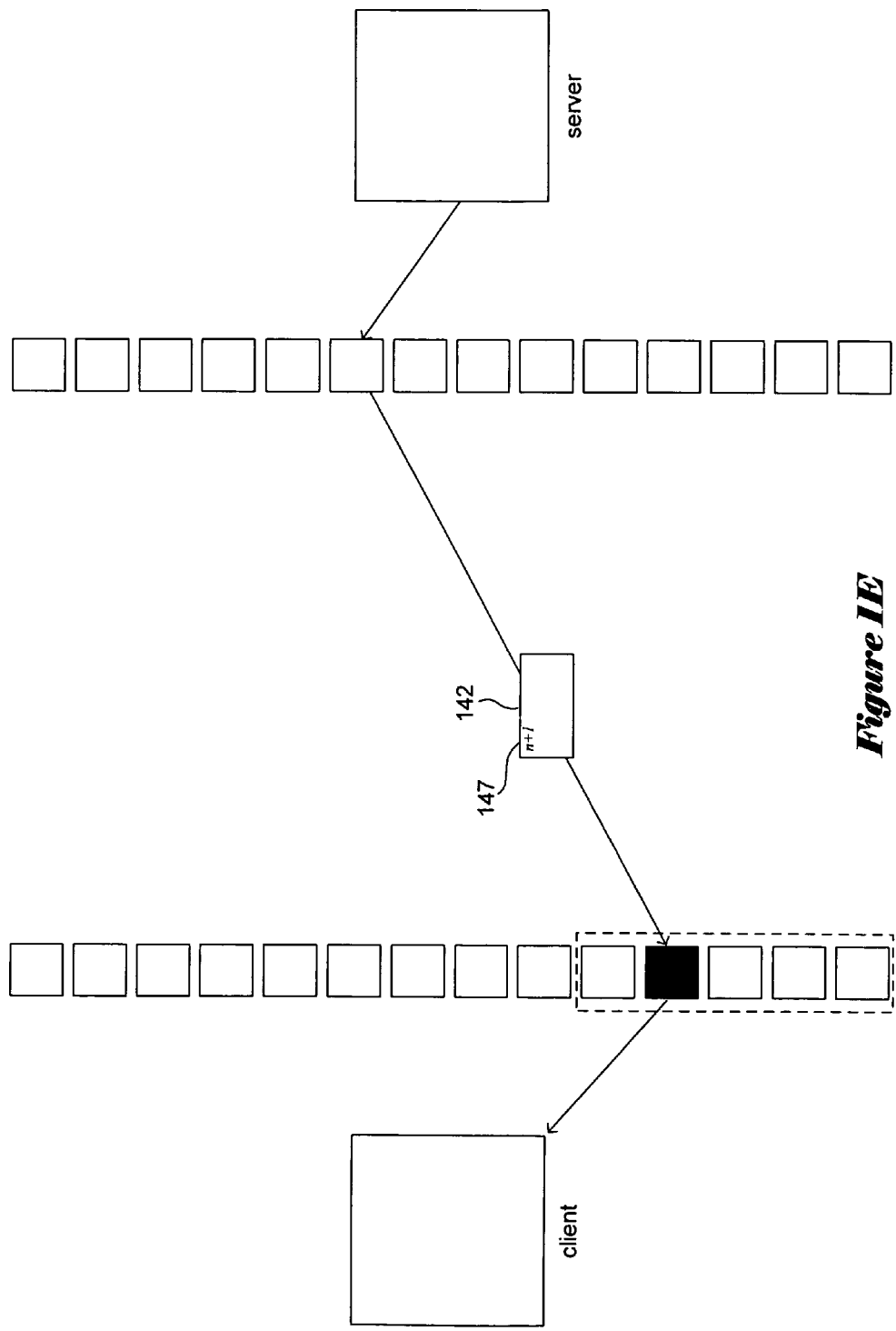
Figure 1H:
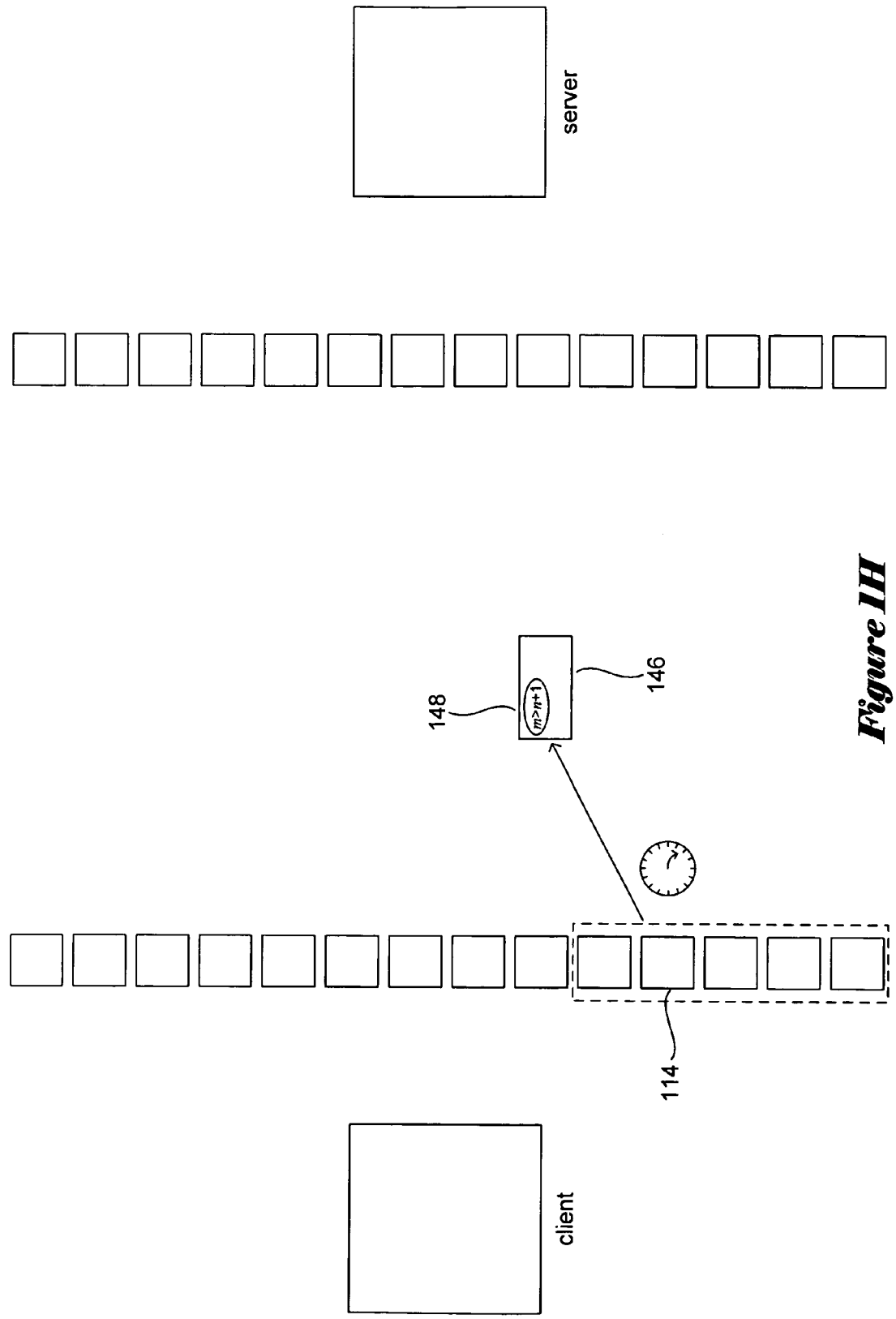
FIG. 1H shows a second reallocation-enabling event that allows port 114 to again become available for reallocation.
Figure 11:
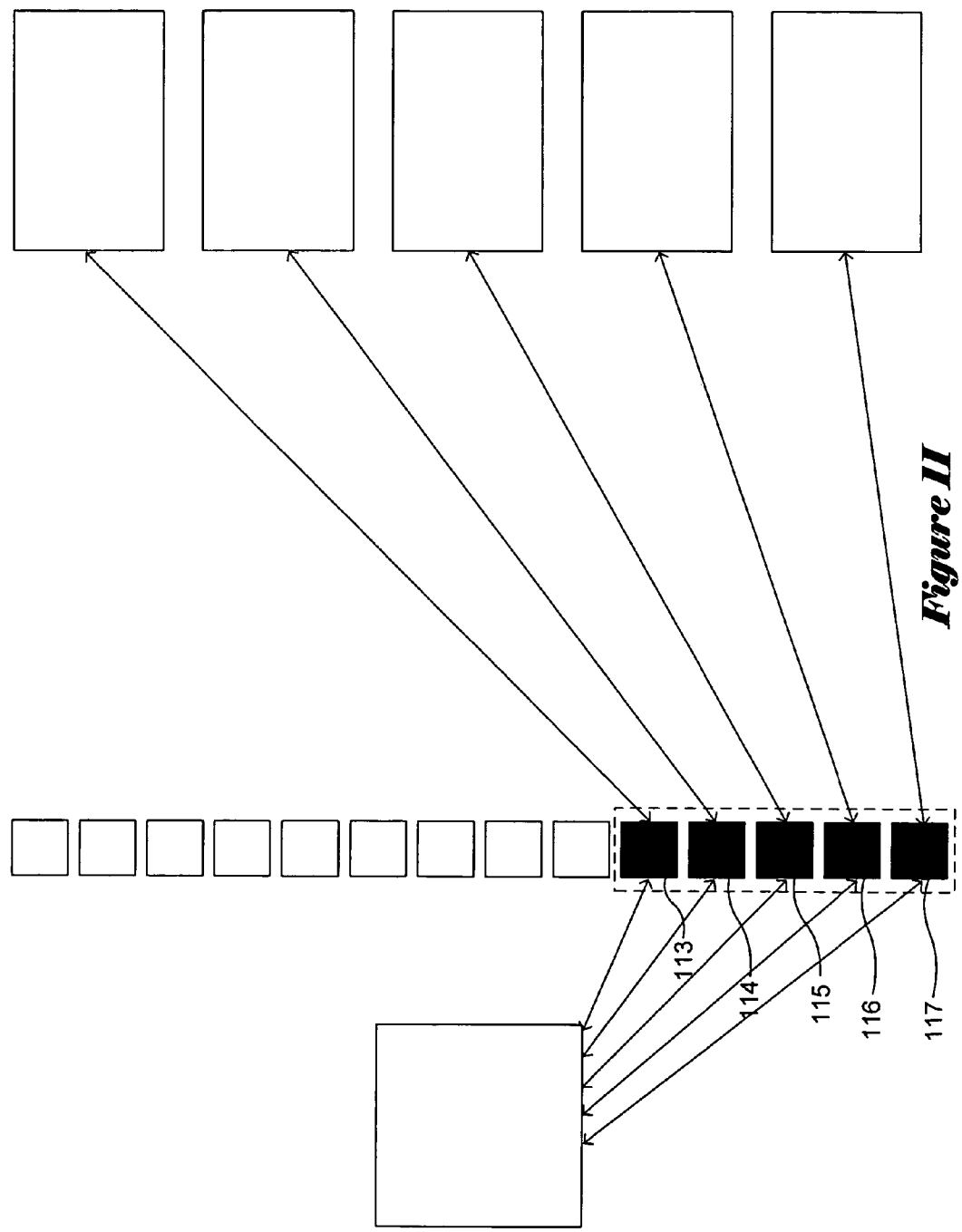
Figure 1J:
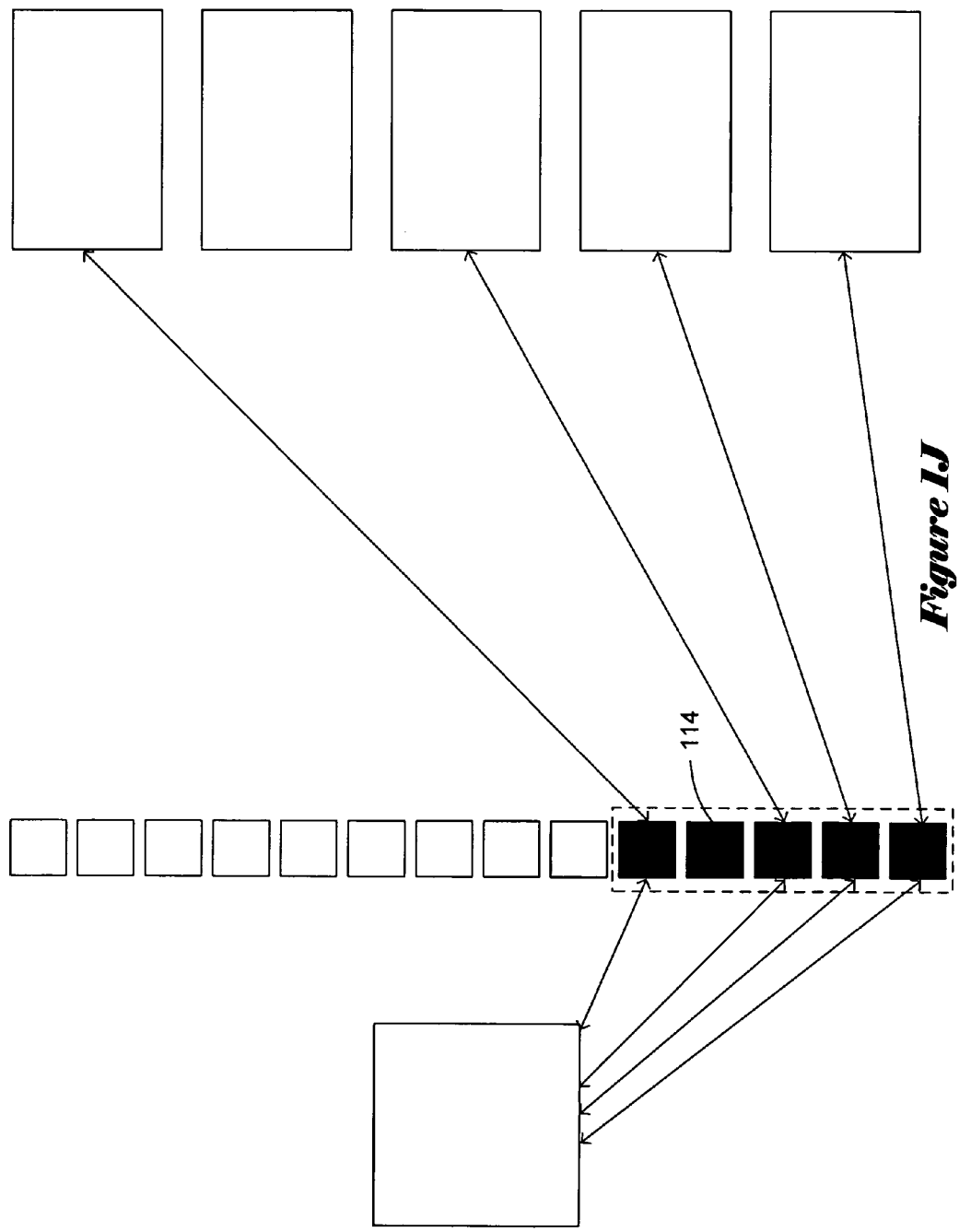
FIG. 1J illustrates the system, shown in FIG. 1I, following termination of one of the communications connections.
Figure 2:
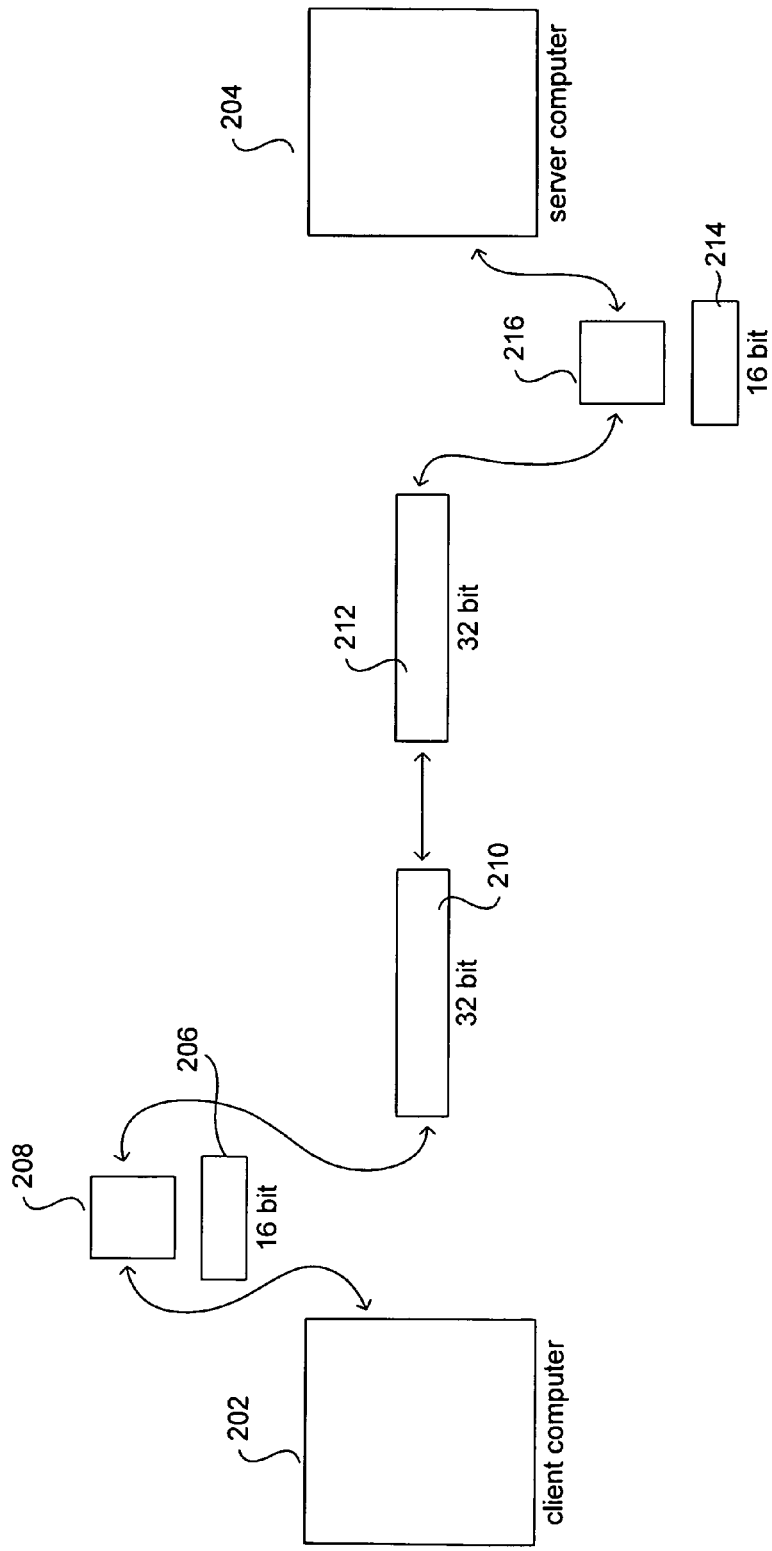
FIG. 2 illustrates the components of a numerical specifier for, or address of, a communications connection such as the communications connections discussed above with reference to FIGS. 1B-H.

A communications connection may generally be specified by a numerical combination of numerical identifiers of logical and/or physical components that contribute to the communications connection. For example, a communications endpoint may be specified by a combination of a protocol address, a protocol type, and a protocol port. As another example, used in the following discussion, a communications connection may be uniquely specified, in certain communications-protocol and networking implementations, by a single number comprising four fields. FIG. 2 illustrates the components of a numerical specifier for, or address of, a communications connection such as the communications connections discussed above with reference to FIGS. 1B-H. In certain systems, a port is specified by a 16-bit unsigned integer, and an IP address of a computer is specified by a 32-bit unsigned integer. As shown in FIG. 2, a particular communications connection between a client computer 202 and a server computer 204 can be uniquely specified by a concatenation of the 16-bit address 206 of the client-computer port 208, the 32-bit IP address 210 of the client computer, the 32-bit address 212 of the server computer, and the 16-bit address 214 of the port 216 of the server computer 204. Thus, a particular communications connection within an exemplary communications network may be uniquely specified as a 96-bit unsigned integer.

Figure 3:
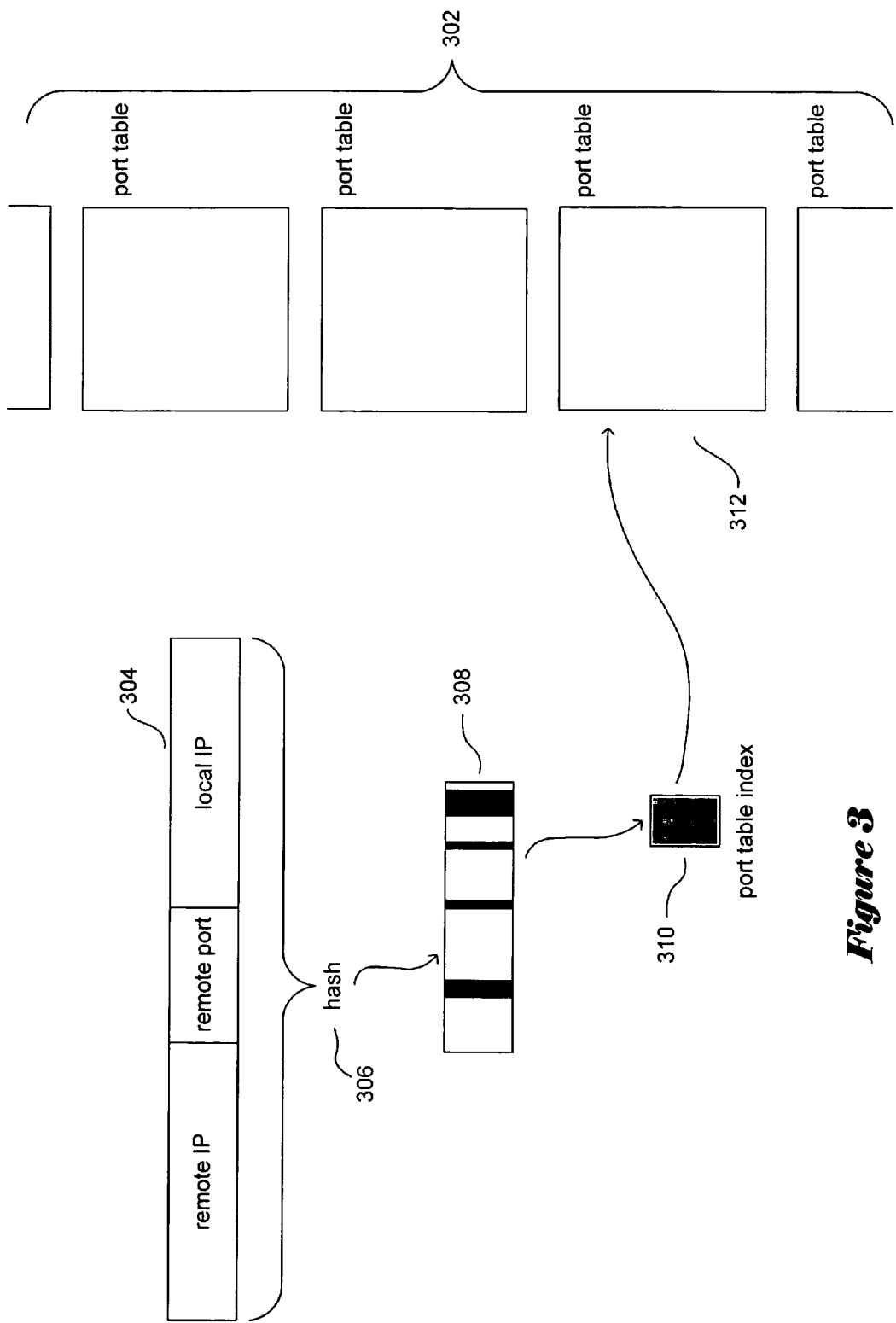
FIG. 3 illustrates a mapping used in certain embodiments of the present invention between the 80-bit non-local-port-address portion of a connection address to a particular port table that represents a sub-partition of the available ephemeral communications ports within a computer system.

From the client computer's perspective, each of the client's ephemeral ports could be combined with a different 80-bit partial connection address that doesn't include the local ephemeral port identifier to produce $2^{80}$ different connection addresses for each ephemeral port address. In other words, when connection addresses are viewed as shown in FIG. 2, a client computer could expand the total number of ephemeral ports, or the ephemeral port space, from some fixed number of ephemeral ports less than $2^{16}$, by a factor of $2^{80}$. Furthermore, it may be convenient to partition the total number of ephemeral communications ports into sub-partitions each associated with a portion of the possible local-IP-address/remote-IP-address/remote-port-address, 80-bit numbers, in order to fairly distribute communications port resources amongst the possible connection addresses. In various embodiments of the present invention, a port table containing available ephemeral communications port numbers is associated with each group in a set of spanning groups of possible values of the 80-bit non-local-port-address portion of a connection address. This allows the total ephemeral port space to be expanded by a multiplier equal to the number of port tables. This also allows for a fair distribution of resources to each of the groups of possible values of the 80-bit non-local-port-address portions of connection-address space. FIG. 3 illustrates a mapping used in certain embodiments of the present invention between the 80-bit non-local-port-address portion of a connection address to a particular port table that represents a sub-partition of the available ephemeral communications ports within a computer system. In order to find the port table from among an array, list, or collection of port tables 302 stored within the computer system, the 80-bit non-local-port-address portion of a connection address 304 is hashed by any of various different hash functions 306 to produce a shorter hash value 308. Certain bits of the hash value are then selected and concatenated together to produce a port-table index 310 which identifies a specific port table 312 within the array or collection of port tables 302 that store available ephemeral communication ports. Many other mappings between 80-bit non-local-port-address portions of connection addresses and port tables are possible.

Each port table comprises an array or list of port-table entries, along with a free pointer and an available pointer that each references a port-table entry within the port table. Each port-table entry includes a port number that uniquely identifies an ephemeral communications port and resource-reallocation-enabling information. In certain embodiments, the resource-reallocation-enabling information is a next sequence number that is generated by adding a randomly or pseudo-randomly generated integer to the last sequence number of a message received or transmitted through the port. A second sequence number follows a first sequence number when the second sequence number is within some fixed distance, modulo a maximum possible sequence number. For example, if the fixed distance is 2 when the sequence numbers range from 0 to 9, then 0 and 1 both follow 9, and 1 and 2 both follow 0. The next sequence number can be considered to be the initial sequence number of the first message of a subsequent connection through the port. In subsequent descriptions, the next sequence number is referred to as an "ISN," or initial sequence number. This sequence number can be used to immediately reallocate the port, as discussed above with reference to FIG. 1H, by, for example, issuing a next connection request with the sequence number through the port. By storing these next sequence numbers in port-tables entries, a deallocated port can be immediately reallocated, without waiting for a fixed period of time to ensure that a remote computer system will not refuse a connection request issued through the port. In alternative embodiments, a last sequence number may be stored, and the next sequence number computed from it, when the port is reallocated and used. Many other types of reallocation-enabling information are possible in different types of systems for managing different types of resources. The ISN, discussed above, is used in the following discussion as exemplary reallocation-enabling information. In addition, many types of malicious attacks on communications systems may be thwarted by initiating message sequencing randomly or pseudo-randomly for each new communications connection.

Figure 4B:

FIGS. 4A-E illustrate various states of a port table, representing one embodiment of the present invention, which result from various operations carried out on the port table. FIG. 4A shows the initial state of an exemplary, 26-entry port table. The port table 402 includes port-table entries, such as port-table entry 404, each of which stores a port number, represented in FIGS. 4A-E by a single upper-case letter, and a next sequence number. In the example of FIGS. 4A-E, next sequence numbers as unsigned integers with values between 1 and 100. In the initial state shown in FIG. 4A, both a free pointer 406 and an available pointer 408 point to the first entry 404 of the port table. The port table contains 26 valid entries, each storing a different port number within the range A-Z. Pointers may be programming-language pointers, numerical array indexes, or any other such value that can be used to identify one of a number of entries.

Figure 4C:
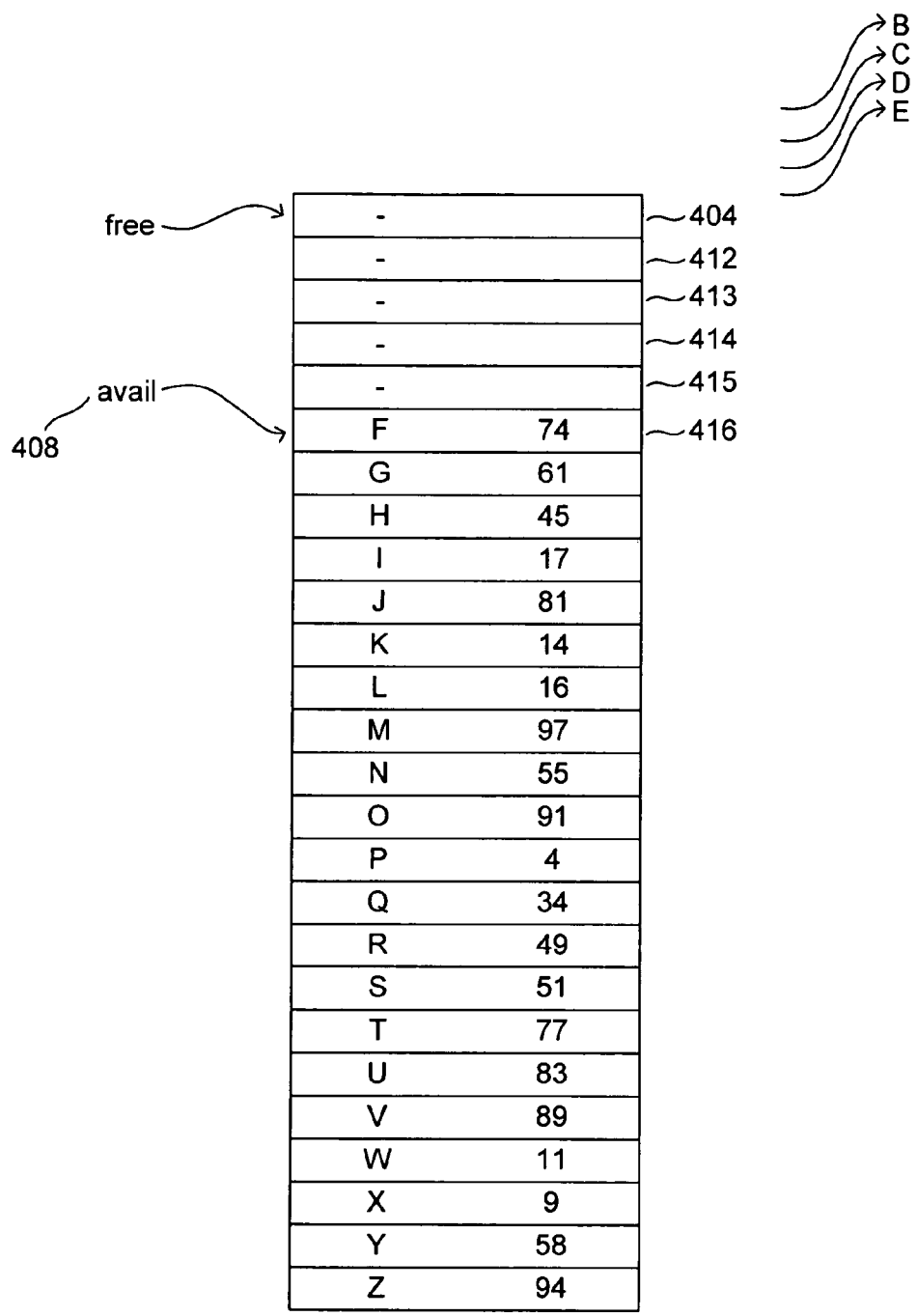

Allocation of a port stored within a port table generally occurs by returning the contents of the port-table entry referenced by the available pointer, clearing the entry, and advancing the available pointer by one port-table entry. The port table is considered a circular buffer, so that when either the free or available pointer points to the final entry 410 in the port table, the pointer is advanced by setting the pointer to reference the first port-table entry 404 in the port table. As a result of allocating the first port A from the exemplary port table of FIGS. 4A-E, the contents of the first port-table entry 404 is cleared, and the available pointer is advanced to point to the second port-table entry 412, as shown in FIG. 4B. As shown in FIG. 4C, four additional allocations which return the port numbers B-E result in the first five entries of the port table 404 and 412-415 having been cleared, and the available pointer 408 referencing the $6^{th}$ port-table entry 416.

Figure 4D:
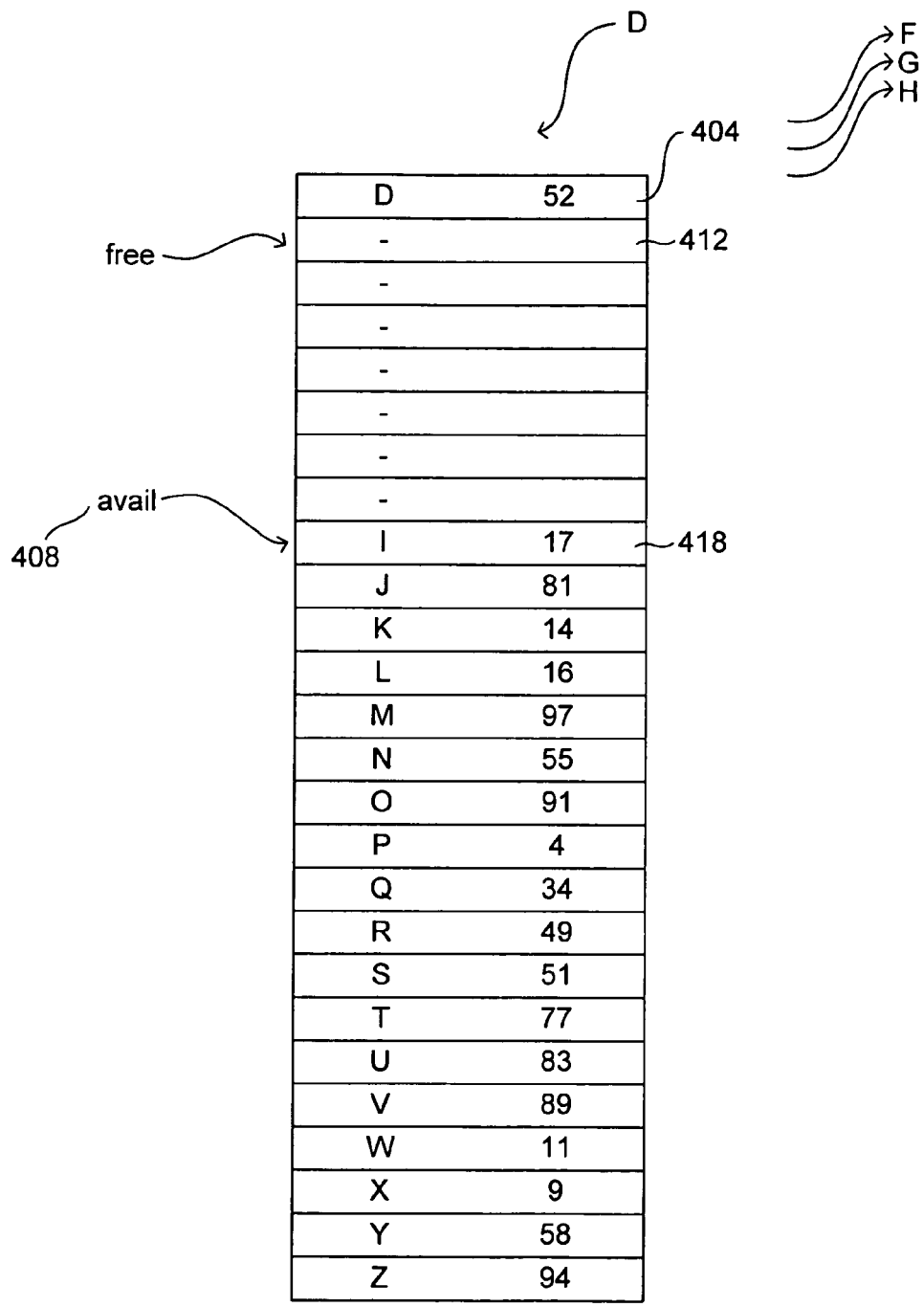
Figure 4E:
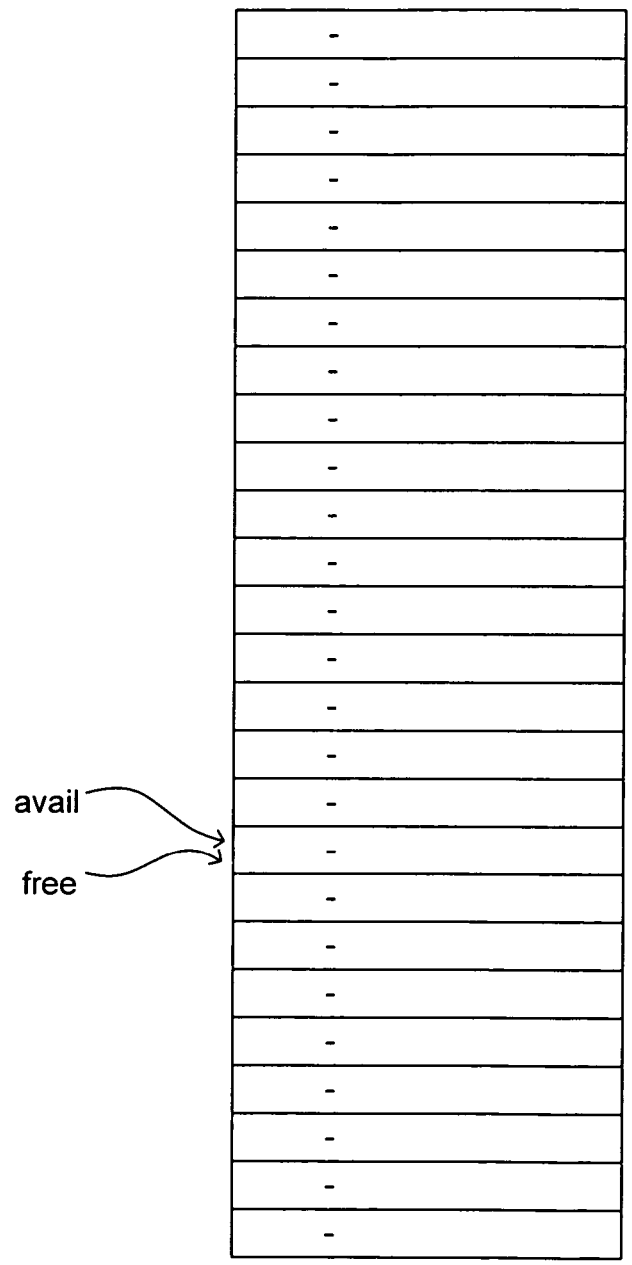

Deallocation is carried out by storing a port number and next sequence number in the port-table entry referenced by the free pointer, and advancing the free pointer to the next port-table entry. FIG. 4D illustrates the state of the exemplary port table following deallocation of the previously allocated port D as well as subsequent allocations of ports F-H. The port D, and a next sequence number, are now stored in the first port-table entry 404, and the free pointer has been advanced to point to the second port-table entry 412. Three additional port allocations from the port table, in which ports F-H are allocated, result in the available pointer 408 referencing the ninth port-table entry 418. When all ports have been allocated from the port table, all port-table entries in the port table are cleared, and the available and free pointers both point to the same port-table entry. FIG. 4E illustrates an exemplary port table from which all available communications ports have been allocated. An attempt to allocate an additional port from the empty port table results in returning a null pointer, error condition, a Boolean false value, or some other indication that allocation has failed.

Thus, rather than storing ephemeral communications ports in a multi-tiered list structure, and suffering wait periods following communications-connection termination, the method and systems of the present invention provide for a computationally efficient, circular-buffer-based port table for storing available ports, and provide for immediate reallocation of ports associated with terminated connections by storing a next sequence number that numerically follows the sequence number of the last message transmitted through the port prior to termination of the previous connection through the port. The method and systems of the present invention thus ameliorate reallocation delays as well as processing and memory overheads associated with complex list structures.

Next, a concise C++-like pseudocode implementation of an ephemeral communications-port management method and system is provided, below, to illustrate one embodiment of the present invention. First, several constants, routines, and a structure are declared:

```
 1 const int MAX_SEQ;
 2 const int MAX_FOLLOW;
 3 void initializeRNG( );
 4 int RNG( );
 5 typedef struct connection
 6 {
 7        unsigned int remoteIP;
 8        unsigned int remotePort;
 9        unsigned int localIP;
10 } CONNECTION;
11 int hashConnection (CONNECTION c, int max);
```

The constant MAX_SEQ, declared above on line 1, is the maximum sequence number for a message and the constant MAX_FOLLOW, declared above on line 2, is the maximum value that can be added to a sequence number, modulo MAX_SEQ, to produce a second sequence number that follows the sequence number. The routine "initializeRNG," declared above on line 3, initialized a random number generator. The routine "RNG," declared above on line 4, is a random number generator that, upon each call, returns a different random number within some range of numbers. The type definition for the type CONNECTION, declared above on lines 5-10, defines the non-local-port-address portion of a connection address, as discussed above with reference to FIG. 3. The routine "hashConnection," declared above on line 11, returns a port-table index from a supplied connection address c and an indication of the largest possible port-table index max. Implementations for the routines "initializeRNG," "RNG," and "hashConnection" are not provided for the sake of clarity and brevity. Random number generators and hashing functions are well known to those skilled in the art of computer programming and computer science. Moreover, such routines may be implemented in a large variety of different ways, depending on desired computational characteristics and implementation constraints.

Next, class declarations are provided for port-table entries, port tables, and a port space that represents an array or collection of port tables from which ports may be allocated and to which ports may be deallocated:

```
12 class portTableEntry
13 {
14       private:
15            unsigned int portNo;
16            unsigned int ISN;
17       public:
18            unsigned int getPort( ) {return portNo;};
19            void setPort(unsigned int p) {portNo = p;};
20            unsigned int getISN( ) {return ISN;}
21            void setISN(unsigned int isn) {ISN = isn;};
22            portTableEntry( );
23 };
24 class portTable
25 {
26       private:
27            portTableEntry* table;
28            unsigned int tableSize;
29            portTableEntry* free;
30            portTableEntry* avail;
31            portTableEntry* last;
32
33       public:
34            portTableEntry* getNextPort( );
35            bool storePort(unsigned int port, unsigned int isn);
36            void init(unsigned int size, unsigned int basePortNo);
37            portTable( );
38 };
39 class portSpace
40 {
41       private:
42            portTable* portTableArray;
43            unsigned int numTables;
44       public:
45            bool allocatePort(CONNECTION c, unsigned int &
                      portNumber,
46                      unsigned int & isn);
47            bool deallocatePort(CONNECTION c, unsigned int
                      portNumber,
48                      unsigned int isn);
49            portSpace(unsigned int tables, unsigned int tableSizes,
50                      unsigned int* basePs);
51 };
```

The class "portTableEntry," declared above on lines 12-23, represents a single entry within a port table, as discussed above with reference to FIGS. 4A-E. Each port table entry includes a port number, "portNo," declared above on line 15, and a next sequence number "ISN," declared above on line 16. The class "portTableEntry" includes function members that allow port number and next sequence number to be retrieved from the port table entry and allow port numbers and next sequence numbers to be entered into the port table entry.

Next, the class "portTable," is declared on lines 24-38. The class "portTable" includes: (1) a table, or array, of port table entries "table," declared above on line 27; (2) an unsigned integer specifying the size, in port-table entries, of the array of port table entries, "tableSize," declared above on line 28; (3) a free pointer, "free," declared above on line 29; (4) an available pointer, "avail," declared above on line 30; and (5) a last pointer, "last," declared above on line 31 that points to the last port-table entry within the port table. The class "portTable" includes: (1) the function member "getNextPort," declared above on line 34, that returns a reference to the port-table entry pointed to by the available pointer, when the port-table entry includes a valid port number, and otherwise returns null; (2) the function member "storeport" that stores a port number and next sequence number in the port-table entry referenced by the free pointer; and (3) an initialization function member "init," declared above on line 36, that initializes a port table.

The class "portSpace," declared above on lines 39-51, defines an ephemeral-communications-port-management object from which ports may be allocated and to which ports may be deallocated. The class "portSpace" includes: (1) an array of port tables, "portTableArray," declared above on line 42; and (2) an unsigned integer "numTables," declared above on line 43, that specifies the number of port tables in the array of port tables "portTableArray." The class "portSpace" includes: (1) the function member "allocatePort," declared on line 45, that allocates a next port from the port space for a particular connection address c, returning TRUE when a port has been successfully allocated and returning FALSE when no port is available; (2) a function member "deallocatePort," declared on line 47, that returns a port number and next sequence number associated with a connection address c; and (3) a constructor "portSpace," declared on line 49, that initializes the port space.

Next, implementations for port table function members are provided:

```
 1 portTableEntry::portTableEntry( )
 2 {
 3      portNo = 0;
 4      ISN = RNG( );
 5 }
 1 portTableEntry* portTable::getNextPort( )
 2 {
 3      portTableEntry* res;
 4
 5      if (avail->getPort( ) != 0)
 6      {
 7          res = avail;
 8          if (avail == last) avail = table;
 9          else avail++;
10          return res;
11      }
12      else return 0;
13 }
 1 bool portTable::storePort(unsigned int port, unsigned int isn)
 2 {
 3      if (free->getPort( ) != 0) return false;
 4      free->setISN((isn + (RNG( ) % MAX_FOLLOW)) %
            MAX_SEQ);
 5      free->setPort(port);
 6      if (free == last) free = table;
 7      else free++;
 8      return true;
 9 }
 1 void portTable::init(unsigned int size, unsigned int basePortNo)
 2 {
 3      unsigned int i;
 4      table = new portTableEntry[size];
 5      last = table − 1;
 6      tableSize = size;
 7      basePortNo++;
 8      for (i = 0; i < size; i++)
 9      {
10          last++;
11          last->setPort(basePortNo++);
12      }
13      avail = free = table;
14 }
 1 portTable::portTable( )
 2 {
 3 }
```

A constructor for the class portTableEntry is first provided. Next, an implementation for the portTableEntry function member getNextPort is provided, above. On line 5, getNextPort, determines whether the available pointer is pointing to a port table entry containing a valid port number. If so, the available pointer is advanced, on lines 8 and 9, and a reference to the port table entry to which the available pointer was pointing prior to advancement is returned. Next, an implementation of the portTable function member storePort is provided. In line 3, storePort checks to make sure the port table entry to which the free pointer is currently pointing is empty. This check is not strictly necessary, because no port should ever be deallocated that hasn't been previously allocated from any particular port table. It should be noted that the currently described implementation largely omits error checking. A commercial or research implementation would generally include sophisticated means for determining whether or not error conditions arise, and for preempting occurrence of serious error conditions in various ways. On line 4, a next sequence number is entered into the port table entry referenced by the free pointer. A supplied, most recently observed sequence number is provided as the argument "ISN," and a random number is added to that sequence number to produce the next sequence number. The random number is restricted to a range such that the next sequence number follows the supplied, most recent sequence number. On line 5, the supplied port number is entered into the port table entry referenced by the free pointer, and on lines 6-7, the free pointer is advanced. Finally, an implementation for the port table function member ini is provided. The function member init allocates an array of port-table entries, on line 4, initializes the contents of the port table entries in the for-loop of lines 8-12, and finally sets the available and free pointers to reference the first port table entry in the port table, on line 13, as discussed above with reference to FIG. 4A.

Finally, implementations for portSpace function members are provided:

```
 1 bool portSpace::allocatePort(CONNECTION c, unsigned int
 2                  &portNumber, unsigned int &isn)
 3 {
 4      int pT;
 5      portTable* p;
 6      portTableEntry* nxt;
 7      pT = hashConnection(c, numTables);
 8      p = &(portTableArray[pT]);
 9      if ((nxt = p->getNextPort( )) != 0)
10      {
11          portNumber = nxt->getPort( );
12          isn = nxt->getISN( );
13          nxt->setPort(0);
14          nxt->setISN(0);
15          return true;
16      }
17      else return false;
18 }
 1 bool portSpace::deallocatePort(CONNECTION c, unsigned int
 2                  portNumber, unsigned int isn)
 3 {
 4      int pT;
 5      portTable* p;
 6      pT = hashConnection(c, numTables);
 7      p = &(portTableArray[pT]);
 8      return (p->storePort(portNumber, isn));
 9 }
 1 portSpace::portSpace(unsigned int tables, unsigned int tableSizes,
 2                  unsigned int* basePs)
 3 {
 4      unsigned int i;
 5      portTable* pt;
 6      initializeRNG( );
 7      portTableArray = new portTable[tables];
 8      pt = portTableArray;
 9      numTables = tables;
10      for (i = 0; i < tables; i++)
11      {
12          pt->init(tableSizes, basePs[i]);
13          pt++;
14      }
15 }
```

The port space function member allocatePort computes an index for the port table associated with the supplied connection address c, on lines 7-8, and then retrieves the next available port number and next sequence number from the port table, on lines 9-16, if there is an available port number within the index port table. Otherwise, the function member allocatePort returns FALSE, on line 17. Similarly, the portSpace function member deallocatePort computes an index for the port table associated with the supplied connection address c on lines 6-7, and stores the supplied port number and most recently used sequence number into the port table via a call to the port table function member storePort, on line 8. Finally, the portSpace constructor initializes the random number generator on line 6, allocates an array of port tables on line 7, and initializes the port tables in the for-loop of lines 10-14.

Although the present invention has been described in terms of particular embodiments, it is not intended that the invention be limited to these embodiments. Modifications within the spirit of the invention will be apparent to those skilled in the art. For example, an essentially limitless number of alternative implementations of communications-port management methods and systems are possible using different program languages, different control structures, different data structures, different modular organizations, and by varying other such implementation parameters. The present invention may be implemented entirely in software, in firmware, in logic circuits, or in some combination of software and hardware. As discussed above, method and system embodiments of the present invention can be applied for management of various types of computational resources in addition to communications ports. In alternative embodiments, rather than storing port numbers in port table entries, port tables may be indexed by port numbers, with only the next sequence numbers and any other, necessary data, stored in port table entries. In alternative embodiments, port tables may have varying sizes, and sizes of port tables may be dynamically expanded as ports are shifted between port tables in order to balance allocation needs dynamically for a system. In alternative embodiments, rather than using an array of port tables, a single port table may suffice for management of all ephemeral communications ports within a system.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purpose of illustration and description. They are not intended to be exhaustive or to limit the invention to the precise forms disclosed. Obviously many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

The invention claimed is:

1. A method for managing a pool of computational resources, each computational resource allocatable from the pool of resources, used for a period of time following allocation, and deallocated and returned to the pool following allocation and use, wherein the computational resources are communications ports, the method comprising:
  storing resource descriptions and resource-reallocation-enabling information in entries of a resource table, wherein the resource-reallocation-enabling information in each entry is a message sequence number;
  when receiving a resource-allocation request,
    returning a resource identifier and resource-reallocation-enabling information contained in an available entry of the resource table, and
    freeing the available entry of the resource table; and
  when receiving a request to deallocate a resource,
    storing an identifier of the resource and resource-reallocation-enabling information into a next free entry of the resource table.

2. The method of claim 1 wherein the resource table is a circular buffer comprising:
  an array of entries;
  a free pointer that points to a free entry of the resource table into which a resource identifier and resource-reallocation-enabling information can be stored; and
  an available pointer that points to an available entry within the resource table containing a resource identifier and resource-reallocation-enabling information.

3. The method of claim 2 wherein returning the resource identifier and resource-reallocation-enabling information stored within an available entry of the resource table further comprises:
  accessing the entry within the resource table referenced by the available pointer;
  when the accessed entry contains a valid resource identifier,
    returning the resource identifier and resource-reallocation-enabling information stored within the entry,
    setting the resource identifier in the entry to an invalid value, and
    advancing the available pointer to point to the next entry in the resource table; and
  when the accessed entry does not contain a valid resource identifier, returning an indication of failure.

4. The method of claim 2 wherein storing the identifier of the resource and resource-reallocation-enabling information into a next free entry of the resource table further comprises:
  storing the resource identifier and resource-reallocation-enabling information into the entry referenced by the free pointer; and
  advancing the free pointer to point to the next entry of the resource table.

5. The method of claim 2 wherein a pointer that currently references a first resource-table entry is advanced by changing the value of the pointer to reference a resource-table entry that follows the first resource-table entry in the array of resource-table entries, a second entry with a resource-table-entry-array index larger, by one entry, than the resource-table-entry-array index of a first entry following the first entry, and the first entry in the array of resource-table entries following the last entry in the array of resource-table entries.

6. The method of claim 2
  wherein resources are allocated for association with uniquely addressable entities,
  wherein the uniquely addressable entities are partitioned into a spanning set of entity groups,
  and wherein a separate resource table stores allocable resources for each entity group.

7. The method of claim 6 wherein a resource table associated with an entity is determined by hashing the entity's address to produce a resource-table identifier.

8. Computer instructions that implement the method of claim 1 stored in a computer-readable memory that does not include carrier waves or other forms of propagating electromagnetic radiation.

9. A method for managing a pool of communications ports, each communications port allocatable from the pool of communications ports, used for a period of time following allocation, and deallocated and returned to the pool following allocation and use, the method comprising:
  storing communications-port descriptions paired with message sequence numbers in entries of a port table;
  when receiving a communications-port-allocation request,
    returning a communications-port identifier and a sequence number stored within an available entry of the communications-port table, and
    freeing the available entry of the port table; and
  when receiving a request to deallocate a communications port,
    storing a communications-port identifier and a sequence number into a next free entry of the port table.

10. The method of claim 9 wherein the port table is a circular buffer comprising:
- an array of entries;
- a free pointer that points to a free entry into which a communications-port identifier and a message sequence number can be stored; and
- an available pointer that points to an available entry within the port table containing a communications-port identifier and a message sequence number.

11. The method of claim 10 wherein returning the communications-port identifier and the message sequence number stored within an available entry of the communications-port table further comprises:
- accessing the entry within the port table referenced by the available pointer;
- when the accessed entry contains a valid communications-port identifier,
  - returning the communications-port identifier and the message sequence number stored within the entry,
  - setting the communications-port identifier in the entry to an invalid value, and
  - advancing the available pointer to point to the next entry in the port table;
- and when the accessed entry does not contain a valid communications-port identifier,
  - returning an indication of failure.

12. The method of claim 10 wherein storing the communications-port identifier and the message sequence number into a next free entry of the port table further comprises:
- storing the communications-port identifier and the message sequence number in the entry referenced by the free pointer; and
- advancing the free pointer to point to the next entry of the resource table.

13. The method of claim 10 wherein a pointer that currently references a first port-table entry is advanced by changing the value of the pointer to reference a port-table entry that follows the first port-table entry in the array of port-table entries, a second entry with a port-table-entry-array index larger, by one entry, than the port-table-entry-array index of a first entry following the first entry, and the first entry in the array of port-table entries following the last entry in the array of port-table entries.

14. The method of claim 10
- wherein communications ports are allocated for association with communications connections having connection addresses,
- wherein the communications connections are partitioned into a spanning set of connection groups,
- and wherein a separate port table stores allocable ports for each connection group.

15. The method of claim 14 wherein a port table associated with a connection is determined by hashing the non-local-port-address portion of the connection's address to produce a port-table identifier.

16. Computer instructions that implement the method of claim 9 stored in a computer-readable memory that does not include carrier waves or other forms of propagating electromagnetic radiation.

\* \* \* \* \*